United States Patent
Debris et al.

(10) Patent No.: US 10,771,426 B2
(45) Date of Patent: Sep. 8, 2020

(54) ROUTING MESSAGES BASED ON MESSAGE TYPE OF MESSAGES

(71) Applicant: SAP SE, Walldorf (DE)

(72) Inventors: Virginie Debris, Paris (FR); Dean Guyton, Reston, VA (US); Sergejs Melderis, Reston, VA (US); Michael Chen, Reston, VA (US)

(73) Assignee: SAP SE, Walldorf (DE)

( * ) Notice: Subject to any disclaimer, the term of this patent is extended or adjusted under 35 U.S.C. 154(b) by 310 days.

(21) Appl. No.: 14/975,957

(22) Filed: Dec. 21, 2015

(65) Prior Publication Data

US 2017/0180303 A1    Jun. 22, 2017

(51) Int. Cl.
*H04L 12/58*    (2006.01)

(52) U.S. Cl.
CPC .............. *H04L 51/36* (2013.01); *H04L 51/14* (2013.01)

(58) Field of Classification Search
CPC ........................... H04L 51/36; H04L 43/0852
See application file for complete search history.

(56) References Cited

U.S. PATENT DOCUMENTS

| | | | |
|---|---|---|---|
| 9,503,407 B2* | 11/2016 | Maes | H04L 51/14 |
| 2002/0111937 A1* | 8/2002 | Wetherbee | G06Q 30/02 |
| 2005/0141522 A1* | 6/2005 | Kadar | H04L 51/38 |
| | | | 370/396 |
| 2010/0234002 A1* | 9/2010 | Scheffer | G06Q 30/02 |
| | | | 455/414.3 |
| 2014/0031070 A1* | 1/2014 | Nowack | H04L 29/06176 |
| | | | 455/466 |
| 2016/0323725 A1* | 11/2016 | Lew | H04W 4/14 |

* cited by examiner

*Primary Examiner* — Nicholas R Taylor
*Assistant Examiner* — Tania M Pena-Santana
(74) *Attorney, Agent, or Firm* — Fish & Richardson P.C.

(57) ABSTRACT

Various embodiments of systems and methods to route a plurality of messages are described herein. Initially a plurality of messages are received from a plurality of service providers. Next the plurality of messages are analyzed to determine a first message, from the plurality of messages, corresponding to a first message type and a second message, from the plurality of messages, corresponding to a second message type. Based on the determined first message type and the second message type, the first message is routed to a first route point and the second message is routed to a second route point.

20 Claims, 7 Drawing Sheets

ROUTING MESSAGES BASED ON MESSAGE TYPE OF MESSAGES

BACKGROUND

Wireless communication has grown exponentially in the previous few decades. Wireless communication allows different type of messages, for example, SMS, MMS, Voice over Internet Protocol (VoIP) message, etc. to be transmitted between senders and receivers.

These different type of messages are to be processed differently before they are delivered to the receiver. For example, a SMS message has to be billed based on the receiver information, for example location of the receiver, etc. At present the different type of messages are routed through the same routing path. This leads to delay in identifying the processing to be applied for the different type of messages, which is undesirable.

BRIEF DESCRIPTION OF THE DRAWINGS

The embodiments are illustrated by way of example and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques to route messages based on message type of messages are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one embodiment. Thus, the appearances of these phrases in various places throughout this specification are not necessarily all referring to the same embodiment. Furthermore, the particular features, structures, or characteristics may be combined in any suitable manner in one or more embodiments.

Message refers to information in any form, including, written, visual, or audio form. For example, the message may include a messaging artifact, for example, Short Message Service (SMS) message, a Multimedia Message Service (MMS) message, etc., or a communication artifact, for example, a Voice over Internet Protocol (VoIP) message stream, a Session Initiation Protocol (SIP) artifact, a voice telephone call, etc. The message may also include, for example, a video data stream such as a movie, a video conference call, etc., or an audio stream, for example, a song. In one embodiment, the message may be transmitted from a sender to a receiver. The sender may include, for example, an enterprise, a user, or a service provider. Similarly the receiver may include, for example, a user.

In one embodiment, message may be classified according to different message types, for example, according to the sender of the message, the content of the message, or any other feature related to the message. Message classified according to one message type may be processed differently from message classified according to another message type. For example, message 1 may be of an Application to Person (A2P) message type that is sent from an enterprise to several users (persons) and a message 2 may be a Person to Person (P2P) message type that is sent from one person to another person. In this case the processing of the first message, corresponding to the A2P type, may include, for example, handling the one-to-many communication whereas processing the second message, corresponding to the P2P type, may include, for example, checking whether the receiver of the message is a member of closed user group (CUG) of the sender, physical location of the receiver, etc.

In one embodiment, message may include several message properties that provide information related to the message. The message properties may include, for example, the originating address of the message, the destination address of the message, the data encoding format for the message, etc. In one embodiment, a message proxy may be used for routing the message to different destinations. A message proxy is a hardware or software that intercepts the different messages and then routes it to different communication channels.

Figure 1:
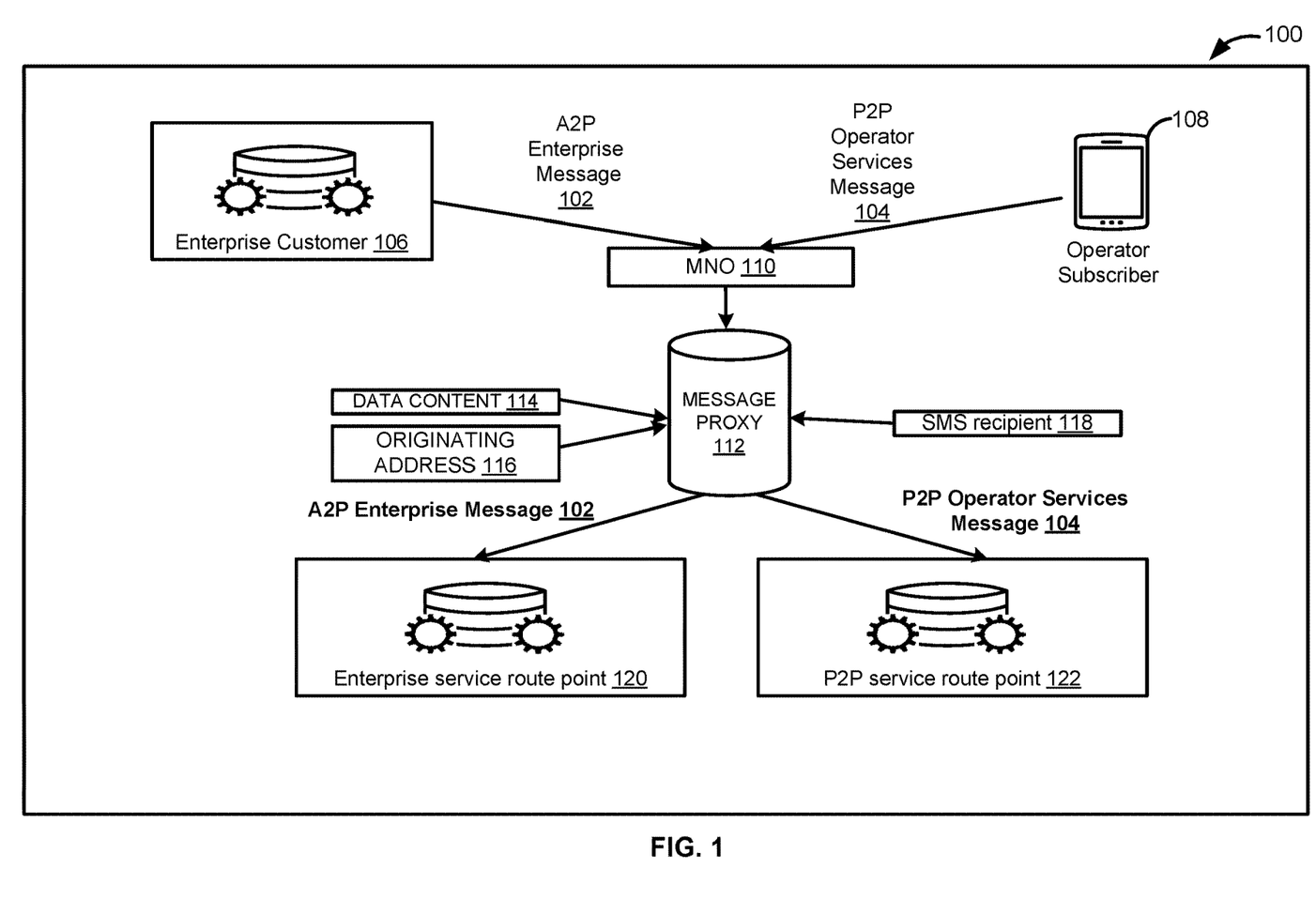
FIG. 1 is an exemplary block diagram illustrating a system for routing messages, according to an embodiment.

FIG. 1 is an exemplary block diagram 100 illustrating a system for routing messages, according to an embodiment. An A2P enterprise message 102 and a P2P operator service message 104 may be received from message senders, for example, an enterprise customer 106 and an operator subscriber 108, respectively. The messages 102 and 104 may be received at a mobile network operator (MNO) 110. The MNO 110 may then forward the messages 102 and 104 to a message proxy 112.

In on embodiment, the message proxy 112 includes a set of rules for determining message type of the messages 102 and 104. The message proxy 112 may include three different type of classification rules: pre-classification rules, classification rules, and post-classification rules for determining the message type of the messages. The different classification rules are matched with the message property and message property values of the message to identify if any of the message rules are applicable for a particular message. For example, when the message originating address value is "xxxx" then a matching is performed to identify a message rule, defined for the origination address value "xxxx", which is applicable for the message.

In one embodiment, the pre-classification rules are used to select the messages that are to be considered for determining the message type. In case the message is not selected for determining message type, based on the pre-classification rule, then a default message type may be assigned to the message. Next the classification rules that provide a mapping between the message property values and a message type are used to determine a message type of the message. For example, the classification rules may be that when a data content of a message is repetitive then it is classified as an A2P message or when the originating address of the message is alphanumeric then the data is classified as A2P message. The classification rules may also be, for example, when the message encoding format is binary then the message is classified as A2P message.

Finally the post-classification rule is used to determine whether the determined message type of a message is to be changed in case the message has a distinct combination of message property values defined for the post-classification rule. The message proxy 112 also includes routing rules that determine a route point for routing the data. As shown, the message proxy 112 uses the message property values, data content 114, originating address 116, and SMS receipt 118 to determine the message type of the A2P enterprise message 102 and P2P operator service message 104. Based on applying the classification rules, the message type of the A2P enterprise message 102 is determined as A2P message type and the message type of the P2P operator services message 104 is determined as P2P message type. Further, the message proxy 112 also includes routing rules that define the relationship between a message type and a route point where the message of a particular message type is to be routed. Based on the routing rules included in the message proxy 112, the A2P enterprise message 102 is forwarded to an enterprise service route point 120 and a P2P message route point 122. The messages 102 and 104 received at the different route points 120 and 122 may then be processed differently. For example the A2P enterprise message 102 may be processed for bulk forwarding the message 102 to multiple users whereas the P2P operator services message 104 may be processed to determine the billing to be applied based on location and selected tariff plan of a receiver.

The data proxy thus provides a mechanism to route messages based on the different message types, which allows a tailor-made processing of the messages based on the message type of the messages.

Figure 2A:
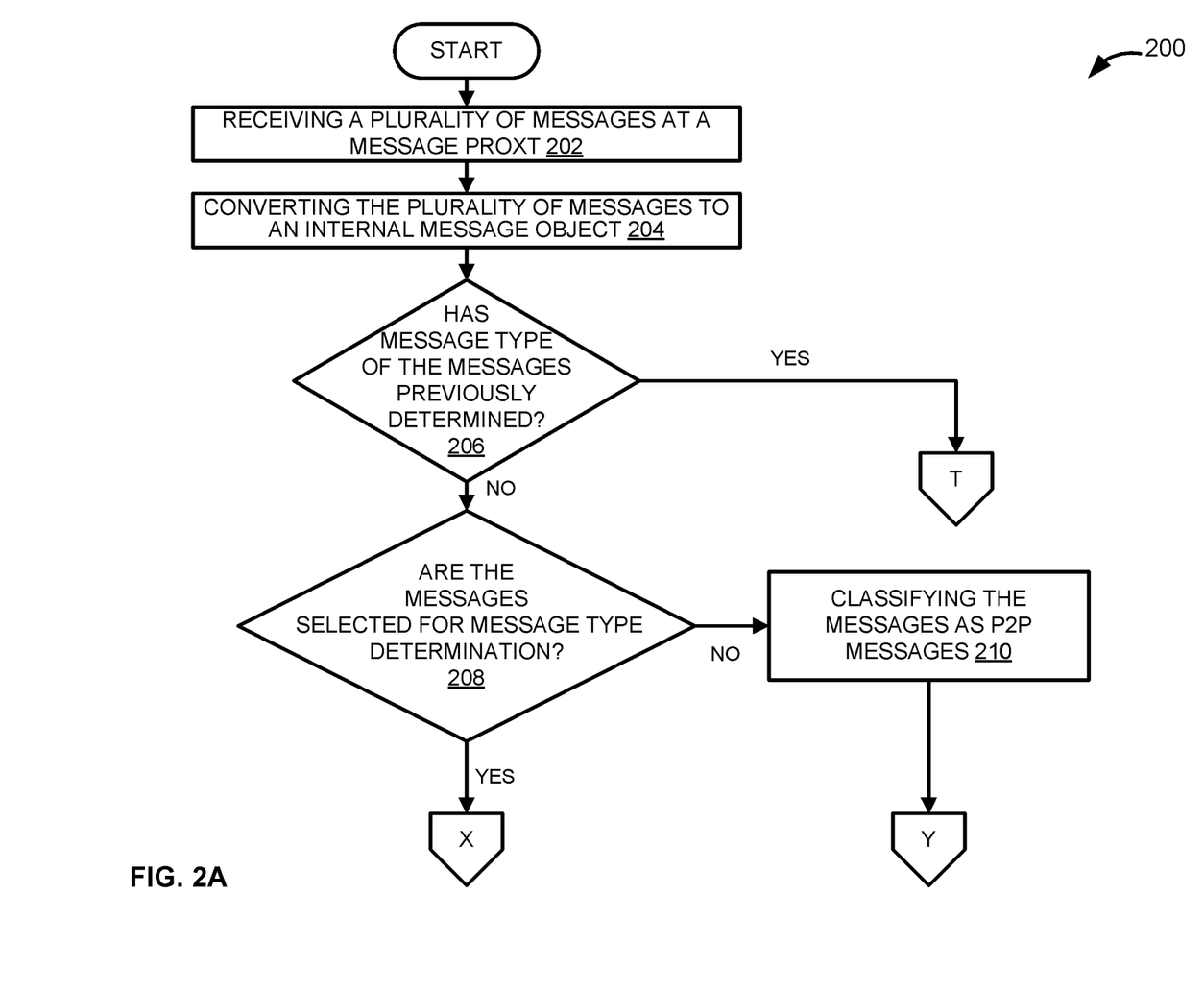
FIGS. 2A-2C is a detailed flow diagram illustrating a process to route a plurality of messages, according to an embodiment.
Figure 2B:
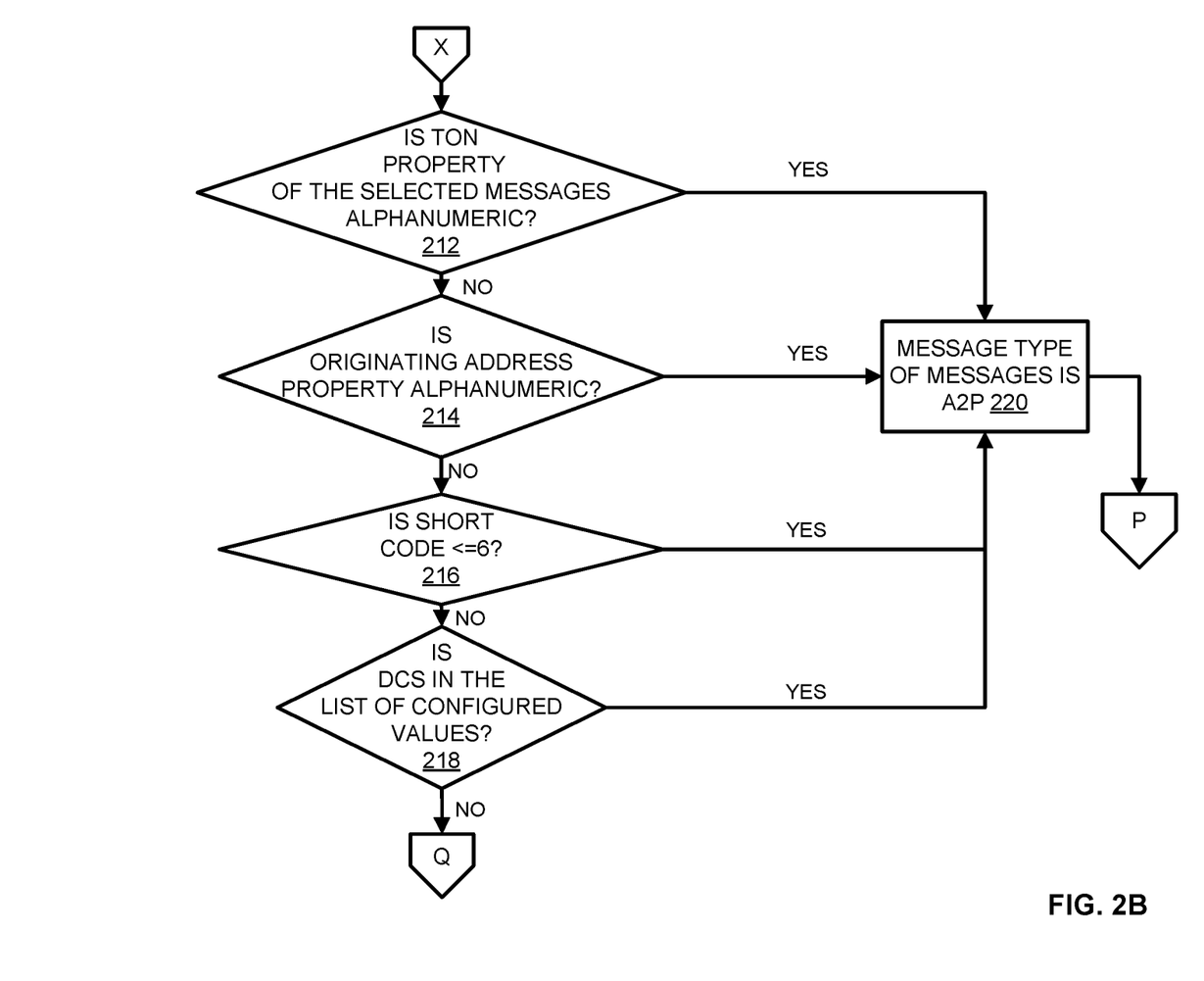
Figure 2C:
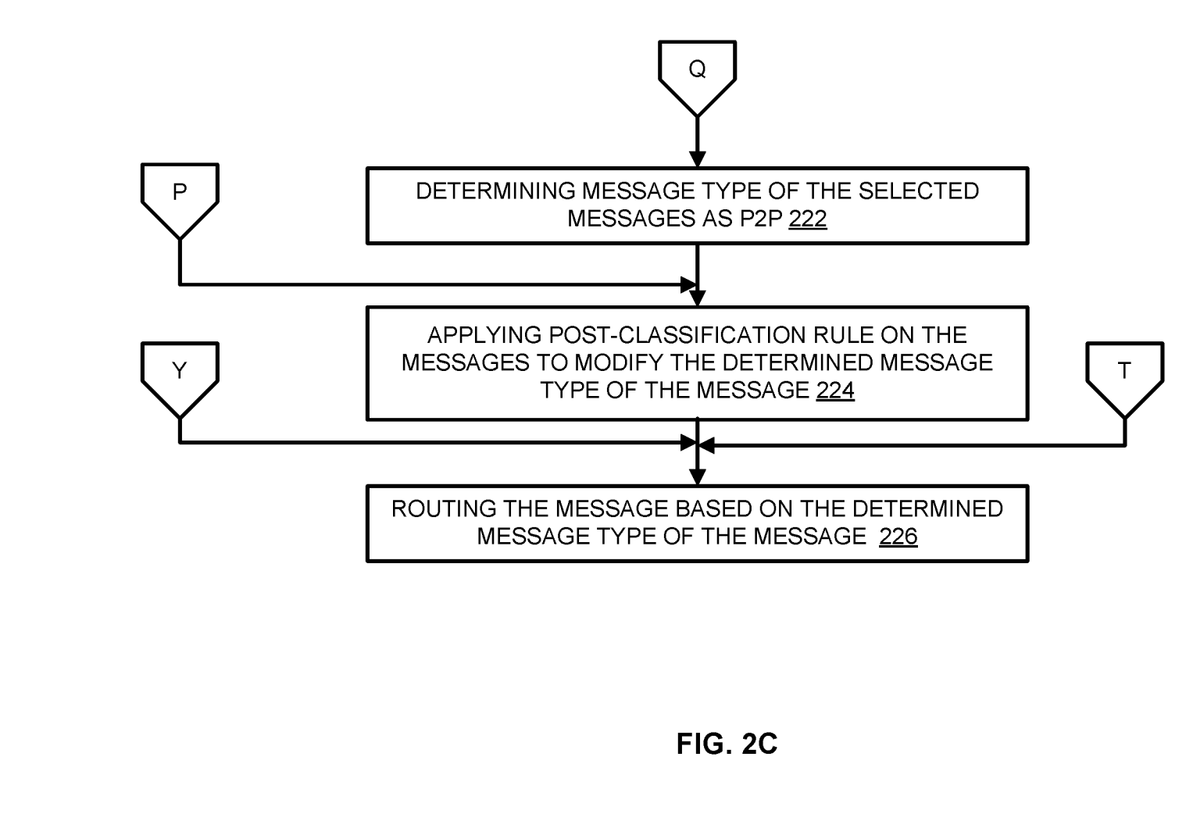

FIGS. 2A-2C is a detailed flow diagram 200 illustrating a process to route a plurality of messages, according to an embodiment. Initially a plurality of messages are received at a message proxy 202. In one embodiment, a message proxy may be, for example, a messaging inter-carrier vendor (MICV). In one embodiment, a MICV may be an element of a telecommunication provider, a landline carrier, an operator, a service bureau or a combination of one or more of these elements. The messages may be received from an origination hub that receives messages from several message service providers.

In one embodiment, some of the messages from the plurality of messages are received at the message proxy. In another embodiment, all the messages may be received at the message proxy. The received messages may then be converted to an internal message object by the message proxy. An internal message object may include a pre-defined template for storing different message property values. For example, the internal message object may include a header field to store the header property of a message. In one embodiment, the internal message object includes a table having several fields corresponding to different message properties. For example, the internal message object may include a message_dcs (data coding scheme) field that stores the encoding scheme (dcs) value corresponding to the message property dcs of the message. The message proxy may retrieve the different message properties and populate the different fields in the internal message object table. The populated internal message object may then be stored at a database.

For example, table 1 shows different message properties (originating address (oadc), data coding scheme (dcs), text, etc. and message property values of a message.

TABLE 1

[MESSAGE]
oadc = +19552322333
dcs = 1
text = Hello World!
[Body}
<World is a beautiful place!>
[<section>]
<name = value>

An internal message object, shown in table 2, may be obtained by extracting the header parameters and header values from the message of Table 1.

TABLE 2

| Header data parameter Name | Header Values |
| --- | --- |
| Data_oadc | +19552322333 |
| Data_dcs | 1 |
| Data-text | Hello World! |

The message properties, stored in the internal message object, are then analyzed to determine a message type of the message. A message type may classify the message, for example, according to the information that may be transmitted by the message (text, picture, and video), the message source (enterprise or person), etc. For identifying the message type, a check may be performed to determine whether the message type of the messages has been previously determined 206. The check may be performed by the message proxy that receives the message.

Next in case a message type of the messages has not been previously determined (condition in 206 is false) then a check is performed to determine whether the messages are to be selected for message type determination 208. In one embodiment, the message proxy includes pre-classification rules that may be used for determining whether a particular message is to be selected for message type determination. The pre-classification rules may include a pre-defined combination of message property and message property values. In case, the message property and messages property values match with the pre-defined combination of message property and message property values then it may be selected as the message that is to be considered for message type determination.

In one embodiment, different pre-classification rules may include different combination of message properties and message property values. The message proxy has to determine the pre-classification rules that are to be used for selecting the messages that are to be considered for message type determination and the order in which these different rules are to be considered. In one embodiment, a truth table may be used in determining the order in which the different pre-classification rules are to be used when determining whether the messages are to be considered for the message type determination. A truth table is a mathematical representation of a logic table that is used in Boolean algebra and Boolean functions. A truth table includes Boolean input variables and the Boolean value that has one of two values, either true (T) or false (F). A truth table is utilized to model possible inputs and outputs to a Boolean function. For example, the function OR(X,Y) can be modeled as seen in Table 3.

TABLE 3

| X | Y | OR(X, Y) |
|---|---|----------|
| T | T | T |
| T | F | T |
| F | T | T |
| F | F | F |

The different pre-classification rules may be used to create a rule table by assuming that each message property in the pre-classification rule is an input variable truth table. Further, when a message property in a pre-classification rule is defined, for example by providing a message property value corresponding to the message property, then it is considered a Boolean True input value in the truth table. For example, when an Originating Address code (OADC) property has a corresponding mobile number defined in the rule then it is represented as true (T) in the truth table. Alternatively, if the value of a message property is undefined, for example when the message property value is not included in a particular pre-classification rule, then this would indicate that any value for the message property may be accepted, for example a wild card character. Undefined input value for a message property may be considered as a Boolean False (F) in the truth table.

Truth tables return a Boolean value (Truth or False) and not a numeric value, priority value, which may be used for determining the priority of the different pre-classification rules. A priority matrix may be used for determining the priority values of the different pre-classification rules. A priority matrix provides a relationship between priority value and a distinct combination of message attributes. The priority matrix may provide a priority value corresponding to all possible combination of values for a list of message properties that may be included in the pre-classification rules. For example, consider that only two message properties, Originating Address Code ("OADC") and "calling_gt", where gt stands for global title, are required for determining whether a particular message is to be selected for message type determination. Table 4 shows a priority matrix for the message properties "oadc" and "calling_gt".

TABLE 4

| OADC | CALLING_GT | PRIORITY |
|------|------------|----------|
| T | T | 1 |
| T | F | 2 |
| F | T | 3 |
| F | F | 4 |

Based on the priority matrix shown in Table 4, when a pre-classification rule has a message property value (represented by a Boolean value TRUE ("T")) corresponding to the OADC and CALLING_GT message properties then the rule is assigned a priority 1. When a pre-classification rule has a message property value (represented by a Boolean value TRUE ("T")) corresponding to the OADC message property and no message property value (represented by a Boolean False ("F")) corresponding to the message property "CALLING_GT" then the rule is assigned a priority 2. When a pre-classification rule has a message property value (represented by a Boolean value TRUE ("T")) corresponding to the "CALLING_GT" message property and no value (represented by a Boolean False ("F")) for the message property "OADC" then the rule is assigned a priority 3. When a pre-classification rule has no value (represented by a Boolean False ("F")) corresponding to the OADC message property and no value (represented by a Boolean False ("F")) for the message property "CALLING_GT" then the message is assigned a priority 4.

The priority matrix is then used to determine the priority of the different pre-classification messages. For example, consider two pre-classification rules:

enable.0={"id":0, "properties":{"+calling_gt":"12345", "+oadc":"12345"}}
enable.1={"id":1, "properties":{"oadc":"45678"}}

The enable.x is a unique identifier that identifies each of the pre-classification rule. The priority matrix is then applied on the message property values included in the different pre-classification rule to obtain a pre-classification table (Table 5).

TABLE 5

| OADC | CALLING_GT | PRIORITY |
|------|------------|----------|
| +oadc :"12345" | +calling_gt: 12345 | 1 |
| oadc":"45678" |  | 2 |

Next the obtained pre-classification table is used for selecting the messages for which the data type determination is to be executed. For example, consider a message 1 having an oadc 12345, message 2 having oadc +12345, and message 3 having an oadc 78910. In this case, the message 1 and message 2 that have oadc 12345 are selected as the messages for which the data type is to be determined because the oadc values of both these messages matches with oadc of the rule that has a priority 1. The oadc value of message 3 does not match with either of the rules and therefore message 3 is not selected for determining the message type of the message.

In case a determination is made that none of the messages are to be selected for message type determination (condition in 208 is false) then the message may be classified as P2P messages 210. Next in case a determination is made that the messages are to be selected for message type determination (condition in 208 is true) then the message type of the selected message is determined based on different classification rules. Classification rules check different message property values of the message to determine a message type of the message. As shown, a check is performed to determine whether the type of number (TON) property of the message is alphanumeric 212, whether the originating address property of the message is alphanumeric 214, whether a short code of the selected message is less than or equal to 6 216, or whether data coding scheme (dcs) of the message is within the list of configured values provided by a user 218. In case any of the condition in 212, 214, 216, and 218 are true then the message type of the messages is determined as A2P 220 or else the message type of the messages is determined as P2P message 222.

After the message type of the selected messages has been determined post-classification rules are applied on the messages to modify the determined message type of the messages 224. In one embodiment, the message proxy includes several post-classification rules that are defined to change the message type, of some of the messages, when the message properties of the message matches with the distinct combination of input parameters and values included in the post-classification rules. In one embodiment, the process of modifying the message type of messages after determining the message type is similar to the pre-classification process for selecting the messages to be considered for classification.

For example a priority matrix, similar to the priority matrix defined for pre-classification process, is to be initially defined. The post-classification rules are then prioritized based on the priority matrix. Finally the prioritized message type routing rules is used to determine a modified message type for an already classified message type. For example, consider that the parameters that are to be considered for changing the message type of a message are "calling_gt" and "hub_id". A priority table based on these two parameters is shown in Table 7.

TABLE 6

| Calling_GT | HUB_ID | PRIORITY |
|---|---|---|
| T | T | 1 |
| T | F | 2 |
| F | T | 3 |
| F | F | 4 |

The priority matrix may then be used for determining a message type overriding rule that has a priority value for each of the message type overriding rules, which is determined as the priority values of the pre-classification table 5, along with a message type that defines the message type to be assigned to a message when it matches with the input parameter values defined for a particular message type overriding rule. Table 7 shows a message type overriding table obtained after applying the priority matrix on 2 rules (Rule 1 and Rule 2).

TABLE 7

| Rule Identifier | CALLING_GT | HUB_ID | Priority | Message Type |
|---|---|---|---|---|
| Rule 1 | +calling_gt : "12345" | ISMS | 1 | A2P |
| Rule 2 | calling_gt : "45678" |  | 2 | P2P |

The message type overriding table is then used for determining the message types of the different messages. For example, consider a message 1 having an oadc 12345 and hub_id "ISMS", message 2 having oadc+12345 and hub_id "ISMS", and message 3 having a calling_gt 45678. In this case, the message property values for message 1 and message 2 matches with rule 1 and therefore the overridden message type for messages 1 and 2 is "A2P". The message property value of message 3 matches with rule 2 and therefore message type "P2P" is assigned to the message 3.

Finally the messages are routed based on the determined message type of the messages 226. In one embodiment, the routing logic used the message type classification to determine the route point where a particular message is to be delivered. A route point is a message repository that collects messages to be sent or received to either a mobile service provider (carrier) or a mobile messaging aggregator (a peer). Each route point is distinct within the messaging platform and associates to a single, distinct carrier service.

In one embodiment, for routing the messages, a routing logic included in the message proxy uses a truth table to first define a priority matrix that is used for ranking the different message routing rules. The message routing rule includes a mapping between the message type and the route point where the message is to be routed based on the determined message type. The prioritized message routing rules are then used to route the message based on the message property rules of a message matching with the values of a particular message routing rule. For example, a priority matrix may include three message properties, carrier service, destination carrier service and a message type, which are the three message properties required for routing the messages. Table 8 shows the priority matrix for routing message to the different routing points.

TABLE 8

| Origination Carrier Service | Destination Carrier Service | Message Type | Priority |
|---|---|---|---|
| T | T | T | 1 |
| T | T | F | 2 |
| T | F | T | 3 |
| F | T | T | 4 |
| F | T | F | 5 |
| F | F | T | 6 |
| F | F | F | 7 |

The obtained priority matrix is then used to determine a routing table based on pre-defined routing rules. The pre-defined routing rules may include values for one or more of the origination carrier service, the destination carrier service and the message type. The routing table includes a priority value of each of the routing rules, similar to the pre-classification process, along with a route path that is to be assigned to the message that has message property values matching with the input parameter values defined for a particular routing rule. Table 9 shows a routing table obtained after applying the priority matrix on two routing rules.

TABLE 9

| Origination Carrier Service | Destination Carrier Service | Message Type | Priority | Route Point |
|---|---|---|---|---|
| xxxxxx | Yyyyyy | A2P | 1 | AVX |
| tttttt | Zzzzzz | A2P | 1 | PVX |

A matching is then performed between the message property values of the messages, the message type of which has been determined, and the different values in the routing table and based on the matching the message is transferred to the route point defined for a matched rule.

The process has been explained with respect to A2P and P2P messages. However the same process may be used for routing messages based on message properties any other message type, for example, VoIP, etc.

Figure 3:
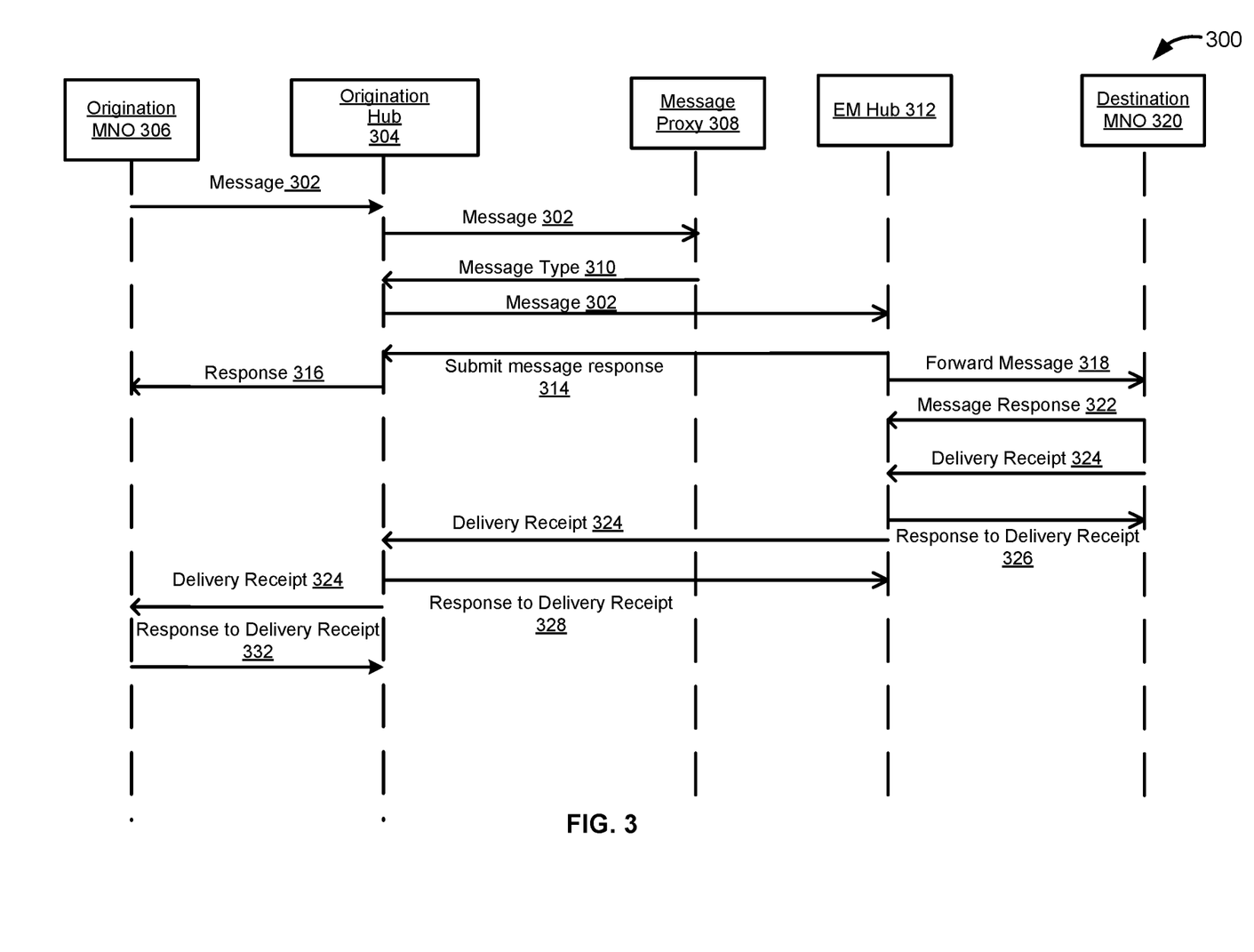
FIG. 3 is a sequence block diagram illustrating a process for routing a message based on a message type of the message, according to an embodiment.

FIG. 3 is a sequence block diagram illustrating a process 300 for routing a message 302 based on a message type of the message 302, according to an embodiment. Initially the message 302 is received at an origination hub 304 from an origination mobile network operator (MNO) 306. In one embodiment, the messages from different mobile network operators are received at the origination hub 304. The origination hub 304 forwards the message 302 to a messaging proxy 308 for determining a message type of the message. The messaging proxy 308 then returns a message type 310 of the message 302 and a route point for routing the message 302 to the origination hub 304. The origination hub 304 then submits the message 302 along with the message type and the route point to an enterprise management (EM) hub 312. The EM hub 312 then submits a message response 314 to indicate that the message has been successfully received. Next the origination hub 304 sends a response 316 to the origination MNO based on the response 314 received from the EM Hub 312.

Next the EM Hub 312 forwards the message 318 to a destination message network operator (MNO) 320 based on route point information included in the message 302. A message response 322, corresponding to the forwarded message, is then received at the EM hub 312 from the destination MNO 320.

In one embodiment, the destination MNO 320 also sends a delivery receipt 324 indicating a successful delivery of the message, to the EM hub 312. The destination MNO 320 may send a response to delivery receipt 326, to the EM Hub 312, indicating successful delivery of message to the destination MNO 320. The EM Hub 312 then forwards the delivery receipt 324 to the origination hub 304 that sends a response to delivery receipt 328 to the EM hub 312 on successful receipt of the delivery receipt. In one embodiment, the origination hub 304 may forward the delivery receipt 324 to the origination MNO 306 in case the origination MNO 306 requests for this information, the origination MNO 306 then sends a response to the delivery receipt 332 to the origination Hub 304 upon successful delivery of the delivery receipt.

Figure 4:
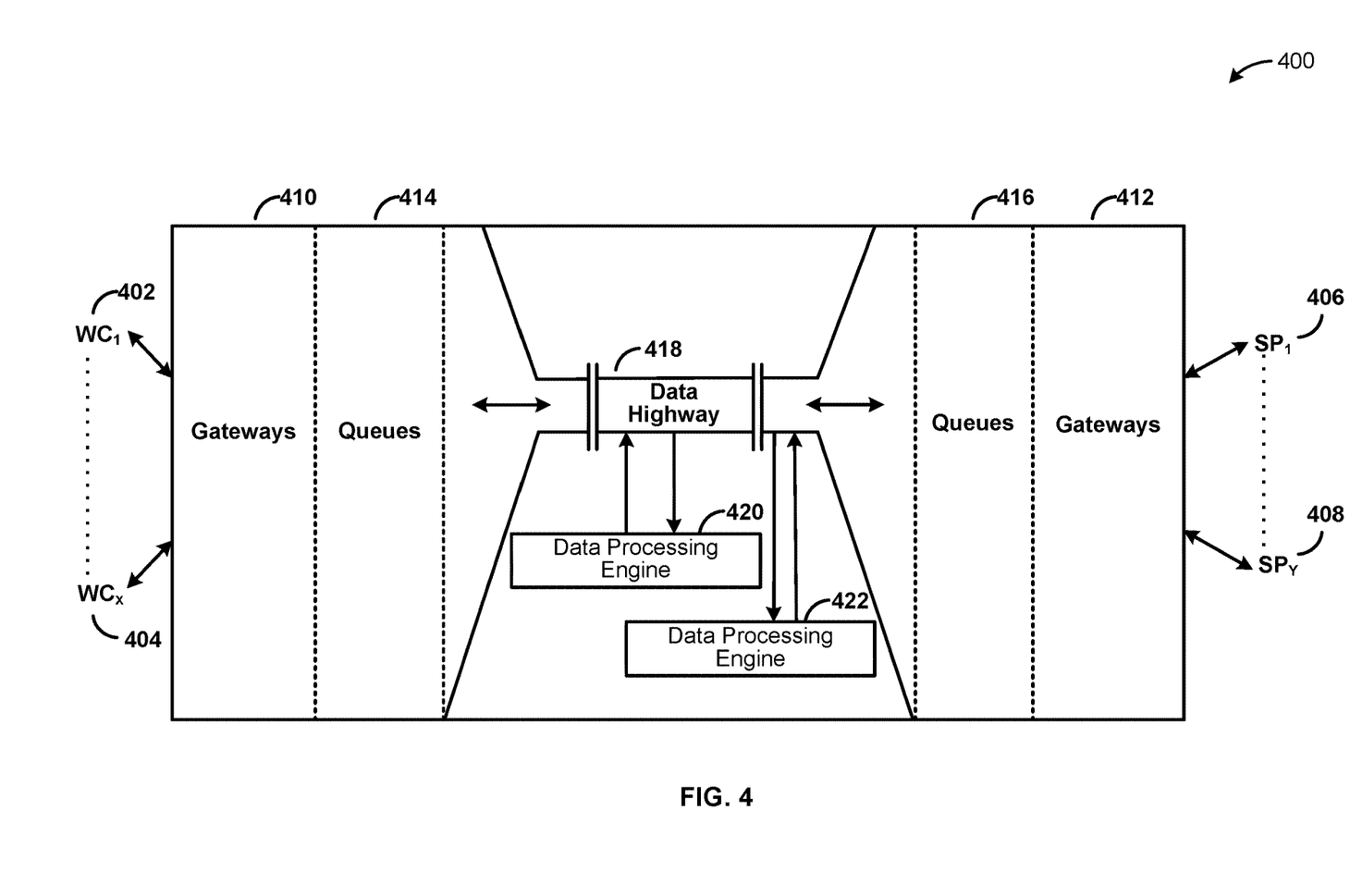
FIG. 4 is a block diagram illustrating components of a messaging proxy, according to an embodiment.

FIG. 4 is a block diagram illustrating components of a messaging proxy 400, according to an embodiment. The messaging proxy may be positioned between several wireless carriers ($WC_1$ 402 to $WC_x$ 404) and service providers ($SP_1$ 406 to $SP_x$ 408). The message proxy 400 includes gateways 410 and 412 that allows exchange of information, for example, information, data, receipt between WCs and SPs. The messaging proxy 400 also includes Queues 414 and 416 (that provide interim storage and buffering capabilities), a Data Highway (DH 418, that for example provides interconnection capabilities), and Data Processing Engines (DPEs) 420 and 422. A DPE may comprise, for example, a flexible, extensible, and dynamically configurable set of rules, workflows, logic, etc. that may support the inspection, analysis, etc. of various message attribute, determining of message type of the message, and routing the message based on the determined message type.

Some embodiments may include the above-described methods being written as one or more software components. These components, and the functionality associated may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 5:
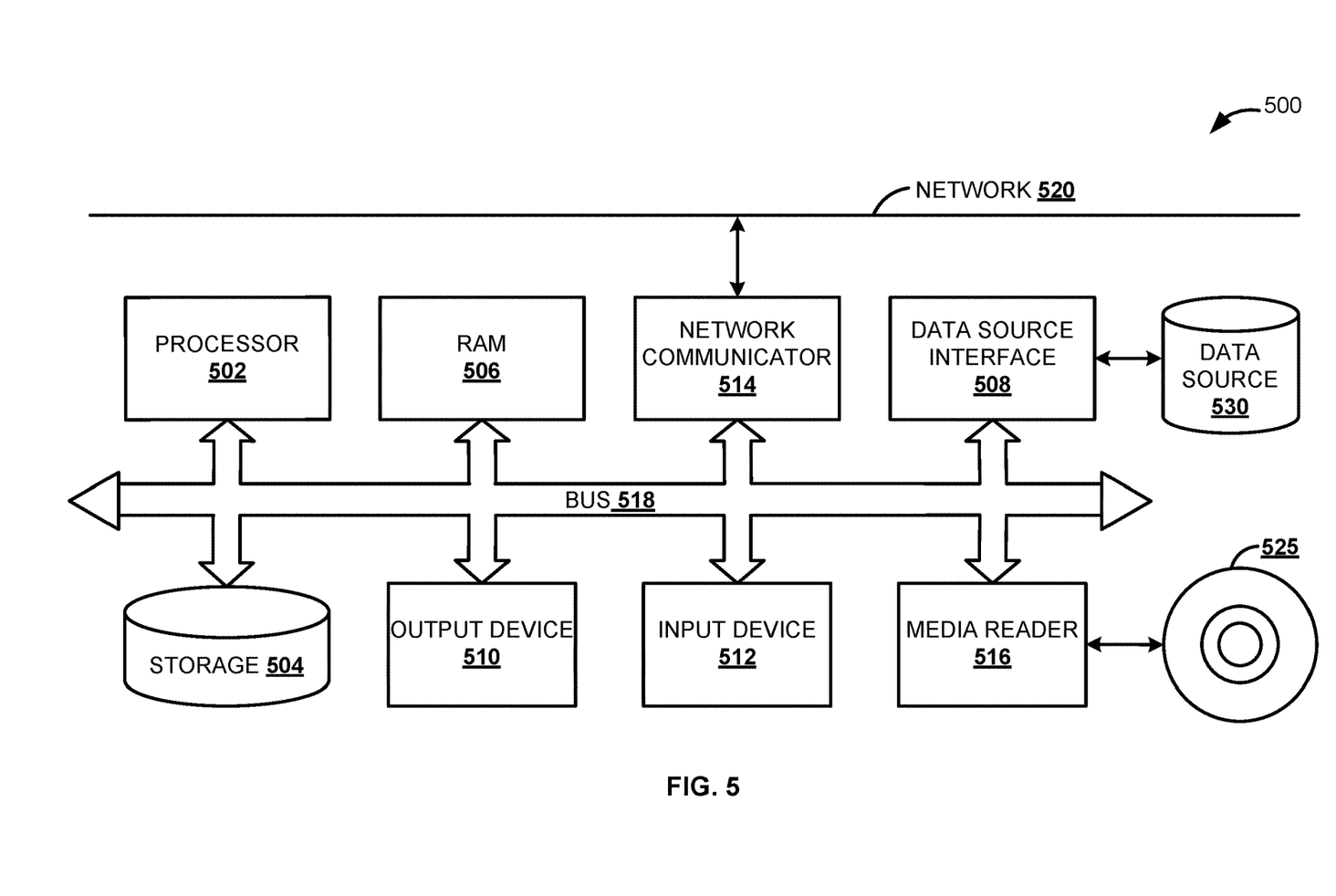
FIG. 5 is a block diagram illustrating a computing environment to route messages, according to an embodiment.

FIG. 5 is a block diagram of an exemplary computer system 500. The computer system 500 includes a processor 502 that executes software instructions or code stored on a computer readable storage medium 525 to perform the above-illustrated methods of the invention. The computer system 500 includes a media reader 516 to read the instructions from the computer readable storage medium 525 and store the instructions in storage 504 or in random access memory (RAM) 506. The storage 504 provides a large space for keeping static data where at least some instructions could be stored for later execution. The stored instructions may be further compiled to generate other representations of the instructions and dynamically stored in the RAM 506. The processor 502 reads instructions from the RAM 506 and performs actions as instructed. According to one embodiment, the computer system 500 further includes an output device 510 (e.g., a display) to provide at least some of the results of the execution as output including, but not limited to, visual information to users and an input device 512 to provide a user or another device with means for entering data and/or otherwise interact with the computer system 500. Output devices 510 and input devices 512 could be joined by one or more additional peripherals to further expand the capabilities of the computer system 500. A network communicator 514 may be provided to connect the computer system 500 to a network 520 and in turn to other devices connected to the network 520 including other clients, servers, data stores, and interfaces, for instance. The modules of the computer system 500 are interconnected via a bus 518. Computer system 500 includes a data source interface 508 to access data source 530. The data source 530 can be accessed via one or more abstraction layers implemented in hardware or software. For example, the data source 530 may be accessed by network 520. In some embodiments the data source 530 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the invention are described herein for illustrative purposes, various equivalent modifications are possible within the scope of the invention, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method comprising:
   receiving a message from a service provider;
   identifying that a message type of the message is not previously determined;
   upon identifying that the message type of the message is not previously determined, identifying whether the message is selected for message type determination;
   upon identifying that the message is selected for the message type determination, applying a classification rule to determine the message type of the message, wherein the classification rule provides an indication of the message type of the message to be person-to-person (P2P) or application-to-person (A2P);
   upon identifying that the message is not selected for the message type determination, determining the message type of the message as the P2P message; and
   based upon the determined message type of the message, pre-defined routing rules including a first pre-defined routing rule and a second pre-defined routing rule, and a priority of each of the pre-defined routing rules, routing the message to a corresponding route point to allow particular corresponding processing of the message to be performed based on the determined message type of the message.

2. The computer implemented method according to claim 1, wherein a pre-classification rule is applied to identify whether the message is selected for message type determination.

3. The computer implemented method according to claim 1, wherein determining the message type of the message includes assigning a default message type to the message based upon the message content.

4. The computer implemented method according to claim 1, wherein identifying whether the message is selected for message type determination includes:
   matching a message property value and a message property of the message with a message property value and a message property, respectively, included in a pre-classification rule; and
   based on the matching, determining whether the message is selected for the message type determination.

5. The computer implemented method according to claim 1 further comprises: based on a post-classification rule, modifying the determined message type of the message.

6. The computer implemented method according to claim 5, wherein modifying the determined message type of the message comprises:
   matching a message property value and a message property of the message with a message property value and a message property included in the post-classification rule; and
   based on the matching, applying the post-classification rule on the message to modify the message type of the message.

7. A non-transitory computer-readable storage medium to store instructions, which when executed by a computer, cause the computer to perform operations comprising:
   receive a message from a service provider;
   identifying that a message type of the message is not previously determined;
   upon identifying that the message type of the message is not previously determined, identify whether the message is selected for message type determination;
   upon identifying that the message is selected for the message type determination, applying a classification rule to determine the message type of the message, wherein the classification rule provides an indication of the message type of the message to be person-to-person (P2P) or application-to-person (A2P);
   upon identifying that the message is not selected for the message type determination, determine the message type of the message as the P2P message; and
   based upon at least the determined message type of the message, pre-defined routing rules including a first pre-defined routing rule and a second pre-defined routing rule, and a priority of each of the pre-defined routing rules, route the message to a corresponding route point to allow particular corresponding processing of the message to be performed based on the determined message type of the message.

8. The non-transitory computer readable storage medium according to claim 7, wherein a pre-classification rule is applied to identify whether the message is selected for message type determination.

9. The non-transitory computer readable storage medium according to claim 8, wherein determine the message type of the message includes assign a default message type to the message based upon the message content.

10. The non-transitory computer readable storage medium according to claim 8, further comprises instructions which when executed by the computer further causes the computer to:

match a message property value and a message property of the message with a message property value and a message property included in a pre-classification rule; and     based on the matching, determine whether the message type of the message is to be determined.

11. The non-transitory computer readable storage medium according to claim 7, further comprises instructions which when executed by the computer further causes the computer to:

based on a post-classification rule, modify the determined message type the message.

12. The non-transitory computer readable storage medium according to claim 11, further comprises instructions which when executed by the computer further causes the computer to:

match a message property value and a message property of the message with a message property value and a message property included in the post-classification rule; and     based on the matching, apply the post-classification rule on the message.

13. A computer system comprising:

a processor to execute a program code; and a memory coupled to the processor, the memory storing the program code comprising:

receive a message from a service provider;

identify that a message type of the message is not previously determined;

upon identifying that the message type of the message is not previously determined, identifying whether the message is selected for message type determination;

upon identifying that the message is selected for the message type determination, applying a classification rule to determine the message type of the message, wherein the classification rule provides an indication of the message type of the message to be person-to-person (P2P) or application-to-person (A2P);

upon identifying that the message is not selected for the message type determination, determining the message type of the message as the P2P message; and         based upon at least the determined message type of the message, pre-defined routing rules including a first pre-defined routing rule and a second pre-defined routing rule, and a priority of each of the pre-defined routing rules, routing the message to a corresponding route point to allow particular corresponding processing of the message to be performed based on the determined message type of the message.

14. The computer system according to claim 13, wherein the program code further comprises: based on a pre-classification rule, determine whether the message type of the message is to be determined.

15. The computer system according to claim 14, wherein the program code further comprises: assign a default message type to the message based upon the message content.

16. The computer system according to claim 14, wherein the program code further comprises:

match a message property value and a message property of the message with a message property value and a message property included in the pre-classification rule; and     based on the matching, determine whether the message type to be determined for the message.

17. The computer system according to claim 13, wherein the program code further comprises: based on a post-classification rule, modify the determined message type of the message.

18. The computer implemented method of claim 1, wherein the classification rules further comprise determining the message type of the message as the A2P message in response to determining a data content of the message comprises repetitive content.

19. The computer implemented method of claim 1, wherein the classification rules further comprise determining the message type of the message as the A2P message in response to determining an originating address of the message comprises alphanumeric content.

20. The computer implemented method of claim 1, wherein the classification rules further comprise determining the message type of the message as the A2P message in response to determining an encoding format of the message comprises a binary representation.

\* \* \* \* \*